United States Patent [19]
Taylor

[11] Patent Number: 6,027,036
[45] Date of Patent: Feb. 22, 2000

[54] ANIMAL SCENT DELIVERY KIT

[76] Inventor: Jerry L. Taylor, 43 Sharp Rd., Somerville, Ala. 35670

[21] Appl. No.: 09/204,472

[22] Filed: Dec. 3, 1998

[51] Int. Cl.[7] .......................... B65D 85/20; A01M 31/00
[52] U.S. Cl. ...................... 239/53; 206/315.11; 206/289
[58] Field of Search ................. 206/315.11, 579, 206/903; 190/102; 239/53, 34, 6, 289; 43/1

[56] References Cited

U.S. PATENT DOCUMENTS

| | | | |
|---|---|---|---|
| 2,959,354 | 11/1960 | Beck | 239/53 X |
| 3,088,583 | 5/1963 | Holtz | 206/315.11 |
| 4,002,236 | 1/1977 | Tolleson | 206/579 X |
| 4,842,133 | 6/1989 | LaBarge et al. | 206/579 X |
| 5,042,664 | 8/1991 | Shyr et al. | 206/579 |
| 5,307,584 | 5/1994 | Jarvis | 239/6 |
| 5,555,663 | 9/1996 | Burgeson | 239/53 X |
| 5,595,302 | 1/1997 | Maydwell et al. | 206/579 X |

*Primary Examiner*—Kevin Weldon

[57] ABSTRACT

An animal scent delivery kit for quickly deliver animal scents to an area surrounding a hunter to attract animals without the hunter disturbing the surrounding area and leaving their own scent in the area. The kit includes a carrying case with first and second panels pivotally coupled together along a common side. The first panel has a plurality of resiliently elastic loops thereon. Each of the loops of the first panel has an elongate holding tube inserted therethrough. Each holding tube has a plurality of scent distributing arrows provided therein. One of the ends of each of the scent distributing arrows has a bulbous swab tip designed for absorbing a liquid scent for attracting an animal. A miniature bow is provided for shooting a scent distributing arrow therefrom. A bottle is also provided for holding the liquid scent for attracting animals therein. The second panel of the carrying case has a resiliently elastic loop thereon for holding the bottle to the second panel and a flexible securing strap for holding the bow to the second panel.

9 Claims, 2 Drawing Sheets

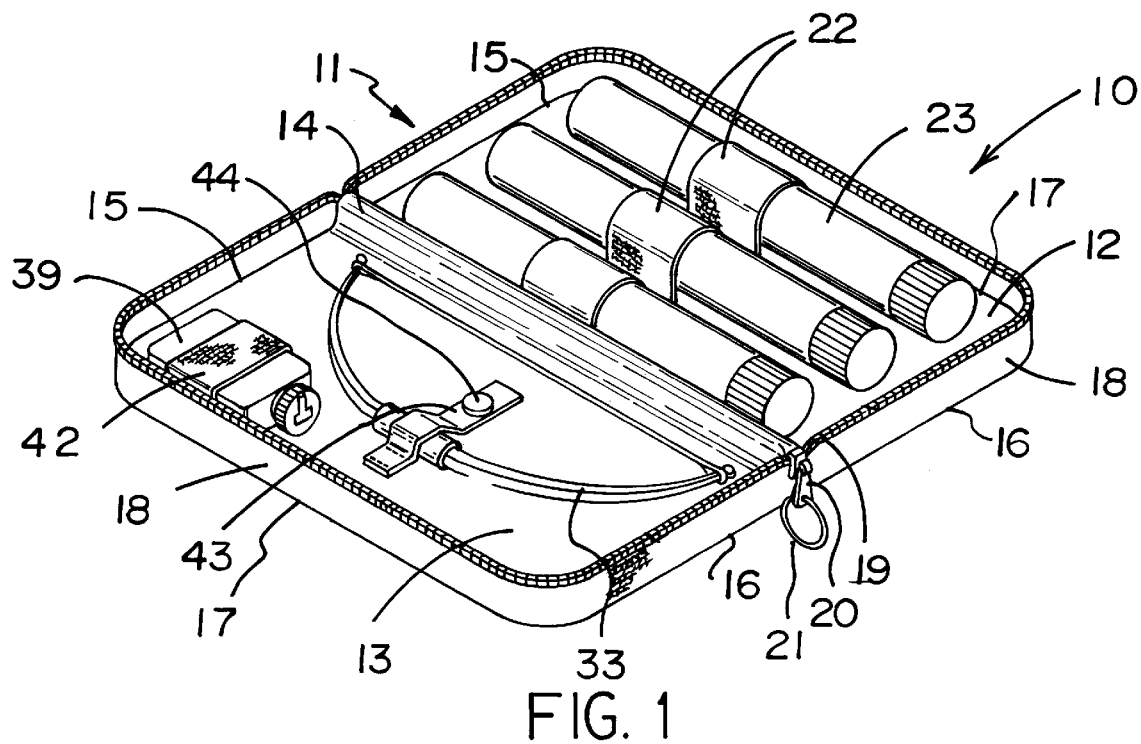
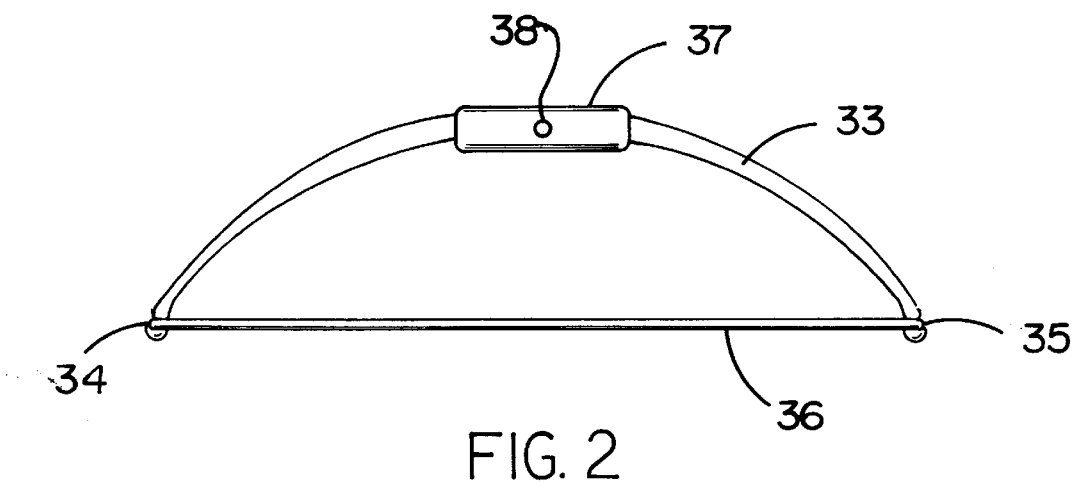

ANIMAL SCENT DELIVERY KIT

BACKGROUND OF THE INVENTION

1. Field of the Invention

The present invention relates to devices for delivering animal scents and more particularly pertains to a new animal scent delivery kit for quickly deliver animal scents to an area surrounding a hunter to attract animals without the hunter disturbing the surrounding area and leaving their own scent in the area.

2. Description of the Prior Art

The use of devices for delivering animal scents is known in the prior art. More specifically, devices for delivering animal scents heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,881,743; U.S. Pat. No. 5,123,657; U.S. Pat. No. 4,726,584; U.S. Pat. No. Des. 282,481; U.S. Pat. No. 3,457,921; and U.S. Pat. No. 2,560,681.

While these devices fulfill their respective, particular objectives and requirements, the aforementioned patents do not disclose a new animal scent delivery kit. The inventive device includes a carrying case with first and second panels pivotally coupled together along a common side. The first panel has a plurality of resiliently elastic loops thereon. Each of the loops of the first panel has an elongate holding tube inserted therethrough. Each holding tube has a plurality of scent distributing arrows provided therein. One of the ends of each of the scent distributing arrows has a bulbous swab tip designed for absorbing a liquid scent for attracting an animal. A miniature bow is provided for shooting a scent distributing arrow therefrom. A bottle is also provided for holding the liquid scent for attracting animals therein. The second panel of the carrying case has a resiliently elastic loop thereon for holding the bottle to the second panel and a flexible securing strap for holding the bow to the second panel.

In these respects, the animal scent delivery kit according to the present invention substantially departs from the conventional concepts and designs of the prior art, and in so doing provides an apparatus primarily developed for the purpose of quickly deliver animal scents to an area surrounding a hunter to attract animals without the hunter disturbing the surrounding area and leaving their own scent in the area.

SUMMARY OF THE INVENTION

In view of the foregoing disadvantages inherent in the known types of devices for delivering animal scents now present in the prior art, the present invention provides a new animal scent delivery kit construction wherein the same can be utilized for quickly deliver animal scents to an area surrounding a hunter to attract animals without the hunter disturbing the surrounding area and leaving their own scent in the area.

The general purpose of the present invention, which will be described subsequently in greater detail, is to provide a new animal scent delivery kit apparatus and method which has many of the advantages of the devices for delivering animal scents mentioned heretofore and many novel features that result in a new animal scent delivery kit which is not anticipated, rendered obvious, suggested, or even implied by any of the prior art devices for delivering animal scents, either alone or in any combination thereof.

To attain this, the present invention generally comprises a carrying case with first and second panels pivotally coupled together along a common side. The first panel has a plurality of resiliently elastic loops thereon. Each of the loops of the first panel has an elongate holding tube inserted therethrough. Each holding tube has a plurality of scent distributing arrows provided therein. One of the ends of each of the scent distributing arrows has a bulbous swab tip designed for absorbing a liquid scent for attracting an animal. A miniature bow is provided for shooting a scent distributing arrow therefrom. A bottle is also provided for holding the liquid scent for attracting animals therein. The second panel of the carrying case has a resiliently elastic loop thereon for holding the bottle to the second panel and a flexible securing strap for holding the bow to the second panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention t o provide a new animal scent delivery kit apparatus and method which has many of the advantages of the devices for delivering animal scents mentioned heretofore and many novel features that result in a new animal scent delivery kit which is not anticipated, rendered obvious, suggested, or even implied by any of the prior art devices for delivering animal scents, either alone or in any combination thereof.

It is another object of the present invention to provide a new animal scent delivery kit which may be easily and efficiently manufactured and marketed.

It is a further object of the present invention to provide a new animal scent delivery kit which is of a durable and reliable construction.

An even further object of the present invention is to provide a new animal scent delivery kit which is susceptible of a low cost of manufacture with regard to both materials and labor, and which accordingly is then susceptible of low prices of sale to the consuming public, thereby making such animal scent delivery kit economically available to the buying public.

Still yet another object of the present invention is to provide a new animal scent delivery kit which provides in the apparatuses and methods of the prior art some of the advantages thereof, while simultaneously overcoming some of the disadvantages normally associated therewith.

Still another object of the present invention is to provide a new animal scent delivery kit for quickly deliver animal scents to an area surrounding a hunter to attract animals without the hunter disturbing the surrounding area and leaving their own scent in the area.

Yet another object of the present invention is to provide a new animal scent delivery kit which includes a carrying case with first and second panels pivotally coupled together along a common side. The first panel has a plurality of resiliently elastic loops thereon. Each of the loops of the first panel has an elongate holding tube inserted therethrough. Each holding tube has a plurality of scent distributing arrows provided therein. One of the ends of each of the scent distributing arrows has a bulbous swab tip designed for absorbing a liquid scent for attracting an animal. A miniature bow is provided for shooting a scent distributing arrow therefrom. A bottle is also provided for holding the liquid scent for attracting animals therein. The second panel of the carrying case has a resiliently elastic loop thereon for holding the bottle to the second panel and a flexible securing strap for holding the bow to the second panel.

Still yet another object of the present invention is to provide a new animal scent delivery kit that allows a bow hunter in a tree stand to deliver animal scent to attract animals such as deer to the area surrounding the tree of the hunter without the hunter climbing down from the tree.

Even still another object of the present invention is to provide a new animal scent delivery kit that fits all of the equipment into a portable carrying case for easy transport in the wilderness and other rugged areas.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new animal scent delivery kit according to the present invention.

FIG. 2 is a schematic side view of the bow of the present invention.

DESCRIPTION OF THE PREFERRED EMBODIMENT

Figure 3:
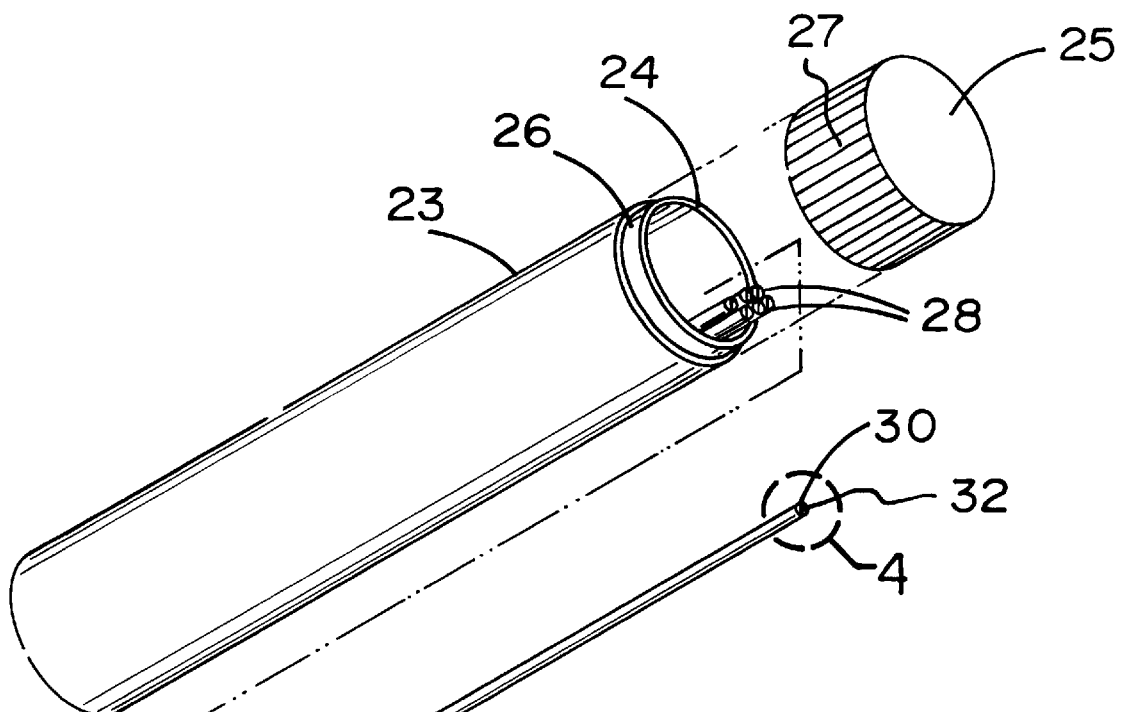
FIG. 3 is a schematic exploded perspective view of a holding tube and scent distributing arrow of the present invention.
Figure 4:
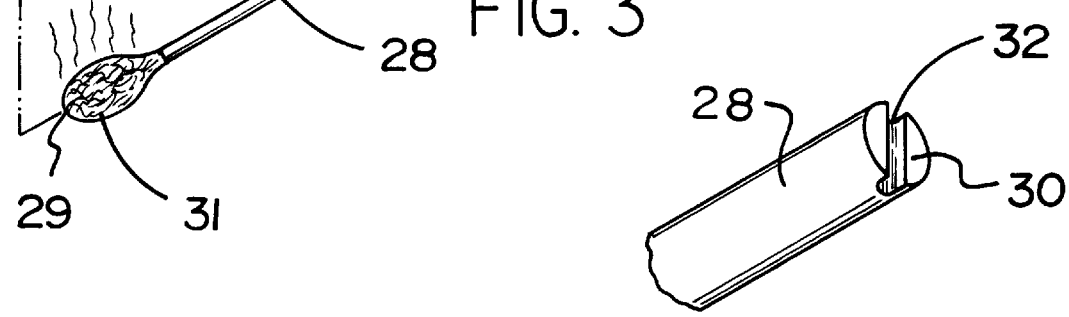
FIG. 4 is a schematic partial perspective view of the notched end of a scent distributing arrow of the present invention taken from the circle 4 of FIG. 3.
Figure 5:
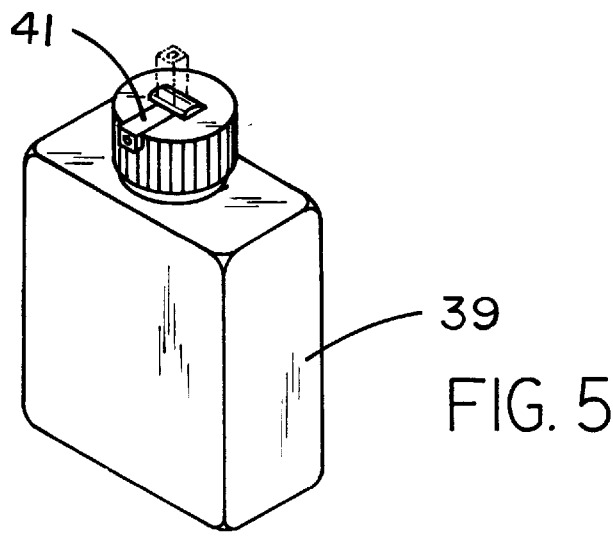
FIG. 5 is a schematic perspective view of the bottle of the present invention illustrating the open and closed positions of the spout.

With reference now to the drawings, and in particular to FIGS. 1 through 5 thereof, a new animal scent delivery kit embodying the principles and concepts of the present invention and generally designated by the reference numeral 10 will be described.

As best illustrated in FIGS. 1 through 5, the animal scent delivery kit 10 generally comprises a carrying case 11 with first and second panels 12,13 pivotally coupled together along a common side 14. The first panel 12 has a plurality of resiliently elastic loops 22 thereon. Each of the loops 22 of the first panel 12 has an elongate holding tube 23 inserted therethrough. Each holding tube 23 has a plurality of scent distributing arrows 28 provided therein. One of the ends 29 of each of the scent distributing arrows 28 has a bulbous swab tip 31 designed for absorbing a liquid scent for attracting an animal. A miniature bow 33 is provided for shooting a scent distributing arrow 28 therefrom. A bottle 39 is also provided for holding the liquid scent for attracting animals therein. The second panel 13 of the carrying case 11 has a resiliently elastic loop 42 thereon for holding the bottle 39 to the second panel 13 and a flexible securing 21 strap 43 for holding the bow 33 to the second panel 13.

In closer detail, the kit 10 comprises a carrying case 11 having generally rectangular first and second panels 12,13 pivotally coupled together along a common side 14. Each of the panels 12,13 of the carrying case 11 has an outer perimeter comprising a pair of ends 15,16 and a free side 17. Each of the panels 12,13 has a length defined between the ends 15,16 of the respective panel and a width defined between the respective free side 17 and the common side 14. Preferably, each of the panels has a perimeter lip 18 extending around the respective outer perimeter. The carrying case 11 has a zipper 19 fastening the perimeter lips 18 of the outer perimeters of the panels together. The zipper 19 has a pull tab 20 with a ring 21 coupled thereto for aiding sliding of the pull tab 20 when fastening and unfastening the outer perimeters with the zipper 19.

The first panel 12 has a plurality of resiliently elastic loops 22 thereon. The loops 22 of the first panel 12 are enclosed in the carrying case 11 when the outer perimeters of the panels 12,13 are fastened together. Ideally, the plurality of loops 22 of the first panel 12 comprises three loops 22. The loops 22 of the first panel 12 are preferably arranged in a row extending along the width of the first panel 12. The row of loops 22 of the first panel 12 is preferably positioned generally along a midline between the ends 15,16 of the first panel 12. The loops 22 of the first panel 12 are spaced apart in the row ideally at generally equal intervals. Each of the loops 22 of the first panel 12 defines a receiving space with a longitudinal axis extending between the ends 15,16 of the first panel 12.

A plurality of elongate holding tubes 23 are provided each having an open end 24 and a cap 25 removably covering 21 the open end 24 of the respective holding tube 23. Ideally, the plurality of holding tubes 23 comprises three holding tubes 23. Each holding tube 23 is associated with a loop 22 of the first panel 12. The holding tubes 23 are inserted through the receiving space of the associated loop 22 of the first panel 12 to hold the holding tubes 23 to the first panel 12. Each of the holding tubes 23 is generally cylindrical and the open ends 24 of the holding tubes 23 each are generally circular. Each of the holding tubes 23 has an annular recess 26 positioned adjacent the respective open end 24. The annular recess 26 of each holding tube 23 is inserted into the associated cap 25 of the holding tube 23 such that each cap 25 closes the associated open end 24 of the holding tubes 23. Each of the caps 25 is preferably generally cylindrical and has a generally cylindrical side wall 27 with a frictionally enhanced outer surface (such as a knurled surface) for aiding removal of the cap 25 from the associated open end 24 with the fingers of a user.

A plurality of scent distributing arrows 28 are provided in each of the holding tubes 23 and are removable from the associated holding tube 23 through the respective open end 24. Each of the scent distributing arrows 28 has a pair of opposite ends 29,30. Each of the scent distributing arrows 28 has a length defined between the ends 29,30 of the respective scent distributing arrow 28. Preferably, the length of each of the scent distributing arrows 28 is less than about 8 inches for easy carrying by a user. Ideally, the lengths the scent distributing arrows 28 are each about 6 inches for ease of carrying while still allowing them to be projected a reasonable distance from the user.

One of the ends 29 of each of the scent distributing arrows 28 has a bulbous swab tip 31 designed for absorbing a liquid such as a liquid scent. Ideally, the swab tips 31 each comprise a cotton swab tip 31. The other end 30 of the each of the scent distributing arrows 28 has a transverse notch 32 therein for receiving the bowstring 21 of a bow 33 or crossbow. Preferably, the swab tips 31 of the scent distributing arrows 28 of a first of the holding tubes are provided already having a scent for attracting animals thereon while the swab tips 31 of the scent distributing arrows 28 of a second of the holding tubes do not have any scent provided thereon so that the user can apply a scent of his choice to the swab tip.

The bow 33 has a pair of opposite tips 34,35, and a bowstring 21 extending between the tips 34,35 of the bow 33. The bow 33 is designed for shooting a scent distributing arrow 28 therefrom. The notches 32 of the scent distributing arrows 28 are designed receiving a portion of the bowstring 21 to aid shooting of the scent distributing arrows 28 by the bow 33. The bow 33 has a length defined between the tips 34,35 of the bow 33. Preferably, the length of the bow 33 is less than about 12 inches to permit easy carrying of the bow 33 by a user. Ideally, the length of the bow 33 is about 7 inches to optimize easy carrying of the bow 33 and for providing a sufficient range to shoot six inch sized scent distributing arrows 28 in a reasonably sized area surrounding the user. The bow 33 preferably has a generally cylindrical handgrip 37 disposed therearound generally located at midpoint between the tips 34,35 of the bow 33. The handgrip 37 has a longitudinal axis and a bore 38 therethrough extending transversely to the longitudinal axis of the handgrip 37. The bore 38 of the handgrip 37 is designed for receiving an end of an elongate rod to permit shooting of the bow 33 in a crossbow-type manner.

The bottle 39 is provided for holding a liquid scent for attracting animals therein. The bottle 39 has a generally rectangular configuration and a detachable lid 40. The lid 40 of the bottle 39 has a spout 41 for pouring 21 the liquid scent in the bottle 39 on to a swab tip 31 of one of the scent distributing arrows 28. The spout 41 is selectively closable to prevent passage of liquid scent therethrough.

The second panel 13 of the carrying case 11 has a resiliently elastic loop 42 thereon. The loop 42 of the second panel 13 is enclosed in the carrying case 11 when the outer perimeters of the panels are fastened together. The loop 42 of the second panel 13 defines a receiving space has a longitudinal axis extending between the ends of the second panel 13. The bottle 39 is removably inserted through the receiving space of the loop of the second panel 13 to hold the bottle 39 to the second panel 13.

The second panel 13 also has a flexible securing strap 43 with a first end coupled to the second panel 13 and a second end detachably coupled to the second panel 13. Ideally, a snap fastener 44 detachably fastens the second end of the securing strap 43 to the second panel 13. The securing strap 43 holds the bow 33 to the second panel 13 such that the bow 33 is enclosed in the carrying case 11 when the outer perimeter of the panels are fastened together.

In use, the user first removes the bow from the carrying case. The user then removes a scent distributing arrow from one of the holding tubes by first removing the cap of the holding tube and removing a scent distributing arrow through the open end of the holding tube. The user may apply liquid scent for attracting animals from the bottle through the spout of the bottle onto the swab tip of the scent distributing arrow. The user then inserts the bowstring into the notch of the scent distributing arrow and pulls back the bowstring with one hand to shoot scent distributing arrow with the bow in an area surrounding the user to attract animals to the location of the animal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A kit, comprising:

a carrying case having first and second panels pivotally coupled together along a common side;

each of said panels of said carrying case having an outer perimeter;

said carrying case having a zipper fastening said outer perimeters of said panels together;

said first panel having a plurality of resiliently elastic loops thereon, said loops of said first panel being enclosed in said carrying case when said outer perimeters of said panels are fastened together;

a plurality of elongate holding tubes each having an open end and a cap removably covering said open end of the respective holding tube, wherein said plurality of holding tubes comprises three holding tubes, each holding tube being associated with a loop of said first panel, said holding tubes being inserted through said receiving space of the associated loop of said first panel to hold said holding tubes to said first panel;

a plurality of scent distributing arrows being provided in each of said holding tubes, each of said scent distributing arrows having a pair of opposite ends;

one of said ends of each of said scent distributing arrows having a bulbous swab tip adapted for absorbing a liquid;

another of said ends of said each of said scent distributing arrows having a transverse notch therein;

a bow having a pair of opposite tips, and a bowstring extending between said tips of said bow, said bow being adapted for shooting a scent distributing arrow therefrom, said notches of said scent distributing arrows being adapted receiving a portion of said bowstring to aid shooting of the scent distributing arrows by said bow;

a bottle for holding a liquid scent for attracting animals therein;

said second panel of said carrying case having a resiliently elastic loop thereon, said loop of said second panel being enclosed in said carrying case when said outer perimeters of said panels are fastened together, said loop of said second panel defining a receiving space having a longitudinal axis extending between said ends of said second panel;

said bottle being removably inserted through said receiving space of said loop of said second panel to hold said bottle to said second panel; and said second panel having a flexible securing strap having a first end coupled to said second panel and a second end detachably coupled to said second panel, said securing strap holding said bow to said second panel such that said bow is enclosed in said carrying case when said outer perimeter of said panels are fastened together.

2. The kit of claim 1, wherein said outer perimeters of said panels each comprise a pair of ends and a free side, each of said panels having a length defined between said ends of the respective panel and a width defined between the respective free side and said common side.

3. The kit of claim 2, wherein said loops of said first panel are arranged in a row extending along said width of said first panel.

4. The kit of claim 3, wherein said row of loops of said first panel is positioned generally along a midline between said ends of said first panel.

5. The kit of claim 3, wherein said loops of said first panel are spaced apart in said row at generally equal intervals.

6. The kit of claim 1, wherein said swab tips of said scent distributing arrows of a first of said holding tubes having a scent for attracting animals provided thereon.

7. The kit of claim 1, wherein said bow has a length defined between said tips of said bow, wherein said length of said bow is less than about 12 inches to permit easy carrying of said bow by a user, and wherein said length of each of said scent distributing arrows is less than about 8 inches.

8. The kit of claim 1, wherein said bow has a generally cylindrical handgrip disposed therearound generally located at midpoint between said tips of said bow, said handgrip having a longitudinal axis and a bore therethrough extending transversely to said longitudinal axis of said handgrip, said bore of said handgrip being adapted for receiving an end of an elongate rod to permit shooting of said bow in a crossbow-type manner.

9. A kit, comprising:

a carrying case having a generally rectangular first and second panels pivotally coupled together along a common side;

each of said panels of said carrying case having an outer perimeter comprising a pair of ends and a free side;

each of said panels having a length defined between said ends of the respective panel and a width defined between the respective free side and said common side;

each of said panels having a perimeter lip extending around the respective outer perimeter;

said carrying case having a zipper fastening said perimeter lips of said outer perimeters of said panels together, said zipper having a pull tab having a ring coupled thereto for aiding sliding of said pull tab when fastening and unfastening said outer perimeters with said zipper;

said first panel having a plurality of resiliently elastic loops thereon, said loops of said first panel being enclosed in said carrying case when said outer perimeters of said panels are fastened together, wherein said plurality of loops of said first panel comprises three loops;

said loops of said first panel being arranged in a row extending along said width of said first panel, said row of loops of said first panel being positioned generally along a midline between said ends of said first panel, said loops of said first panel being spaced apart in said row at generally equal intervals, each of said loops of said first panel defining a receiving space having a longitudinal axis extending between said ends of said first panel;

a plurality of elongate holding tubes each having an open end and a cap removably covering said open end of the respective holding tube, wherein said plurality of holding tubes comprises three holding tubes, each holding tube being associated with a loop of said first panel, said holding tubes being inserted through said receiving space of the associated loop of said first panel to hold said holding tubes to said first panel;

each of said holding tubes being generally cylindrical and said open ends of said holding tubes each being generally circular, each of said holding tubes having an annular recess positioned adjacent the respective open end, said annular recess of each holding tube being inserted into the associated cap of the holding tube such that each cap closes the associated open end of the holding tubes;

each of said caps being generally cylindrical and having a generally cylindrical side wall having a frictionally enhanced outer surface for aiding removal of the cap from the associated open end with the fingers of a user;

a plurality of scent distributing arrows being provided in each of said holding tubes, each of said scent distributing arrows having a pair of opposite ends;

each of said scent distributing arrows having a length defined between said ends of the respective scent distributing arrow, wherein said length of each of said scent distributing arrows is less than about 8 inches for easy carrying by a user;

one of said ends of each of said scent distributing arrows having a bulbous swab tip adapted for absorbing a liquid;

another of said ends of said each of said scent distributing arrows having a transverse notch therein;

said swab tips of said scent distributing arrows of a first of said holding tubes having a scent for attracting animals provided thereon;

a bow having a pair of opposite tips, and a bowstring extending between said tips of said bow, said bow being adapted for shooting a scent distributing arrow therefrom, said notches of said scent distributing arrows being adapted receiving a portion of said bowstring to aid shooting of the scent distributing arrows by said bow;

said bow having a length defined between said tips of said bow, wherein said length of said bow is less than about 12 inches to permit easy carrying of said bow by a user;

said bow having a generally cylindrical handgrip disposed therearound generally located at midpoint between said tips of said bow, said handgrip having a longitudinal axis and a bore therethrough extending transversely to said longitudinal axis of said handgrip, said bore of said handgrip being adapted for receiving an end of an elongate rod to permit shooting of said bow in a crossbow-type manner;

a bottle for holding a liquid scent for attracting animals therein, said bottle having a generally rectangular configuration and a detachable lid, said lid of said bottle having a spout for pouring the liquid scent in said bottle on to a swab tip of one of said scent distributing arrows, said spout being selectively closable to prevent passage of liquid scent therethrough;

said second panel of said carrying case having a resiliently elastic loop thereon, said loop of said second panel being enclosed in said carrying case when said outer perimeters of said panels are fastened together, said loop of said second panel defining a receiving space having a longitudinal axis extending between said ends of said second panel;

said bottle being removably inserted through said receiving space of said loop of said second panel to hold said bottle to said second panel; and said second panel having a flexible securing strap having a first end coupled to said second panel and a second end detachably coupled to said second panel, wherein a snap fastener detachably fastens said second end of said securing strap to said second panel, said securing strap holding said bow to said second panel such that said bow is enclosed in said carrying case when said outer perimeter of said panels are fastened together.

* * * * *